(12) United States Patent
Simpson et al.

(10) Patent No.: US 11,313,398 B2
(45) Date of Patent: Apr. 26, 2022

(54) BLIND TACK FASTENER AND METHODS OF MANUFACTURE

(71) Applicant: The Boeing Company, Chicago, IL (US)

(72) Inventors: Blake A. Simpson, Chicago, IL (US); Sean D. Morden, Chicago, IL (US)

(73) Assignee: The Boeing Company, Chicago, IL (US)

( * ) Notice: Subject to any disclaimer, the term of this patent is extended or adjusted under 35 U.S.C. 154(b) by 373 days.

(21) Appl. No.: 16/543,704

(22) Filed: Aug. 19, 2019

(65) Prior Publication Data
US 2021/0054864 A1 Feb. 25, 2021

(51) Int. Cl.
*F16B 19/10* (2006.01)

(52) U.S. Cl.
CPC ...... *F16B 19/1054* (2013.01); *F16B 19/1063* (2013.01); *F16B 19/10* (2013.01)

(58) Field of Classification Search
CPC .... F16B 13/061; F16B 13/065; F16B 13/066; F16B 13/122; F16B 13/126; F16B 13/128; F16B 19/1054; F16B 19/1063; F16B 19/1072; F16B 19/10
USPC .......................... 411/39, 42, 44, 60.1, 65, 43
See application file for complete search history.

(56) References Cited

U.S. PATENT DOCUMENTS

| 3,253,495 | A | * | 5/1966 | Orloff | F16B 19/1054 411/34 |
|---|---|---|---|---|---|
| 3,657,957 | A | * | 4/1972 | Siebol | F16B 19/1054 411/70 |
| 3,866,998 | A | * | 2/1975 | Iantorno | H01R 13/41 439/870 |
| 4,089,249 | A | * | 5/1978 | Binns | F16B 19/1054 411/43 |
| 4,595,324 | A | * | 6/1986 | Sadri | F16B 19/1063 411/311 |
| 4,639,174 | A | * | 1/1987 | Denham | F16B 19/1054 411/34 |
| 4,789,283 | A | * | 12/1988 | Crawford | F16B 19/008 411/34 |
| 4,826,372 | A | * | 5/1989 | Kendall | F16B 1/0071 411/38 |
| 5,018,920 | A | * | 5/1991 | Speakman | B21J 15/02 411/339 |
| 7,695,226 | B2 | * | 4/2010 | March | F16B 19/05 411/43 |
| 2005/0260056 | A1 | * | 11/2005 | Denham | F16B 19/1063 411/43 |
| 2008/0213063 | A1 | * | 9/2008 | Pratt | F16B 13/066 411/43 |
| 2015/0275953 | A1 | | 10/2015 | Gunther et al. | |

* cited by examiner

*Primary Examiner* — Roberta S Delisle
(74) *Attorney, Agent, or Firm* — McDonnell Boehnen Hulbert & Berghoff LLP

(57) ABSTRACT

The present disclosure provides a blind tack fastener. The blind tack fastener includes an elongated body having a first end and a second end opposite the first end. The blind tack fastener also includes a collar surrounding a portion of the elongated body. The blind tack fastener also includes a sleeve surrounding the elongated body and positioned between the second end of the elongated body and the collar. A region of the sleeve is band annealed.

20 Claims, 7 Drawing Sheets

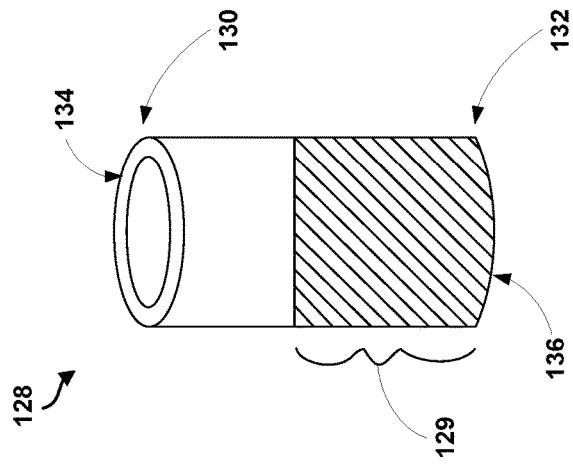
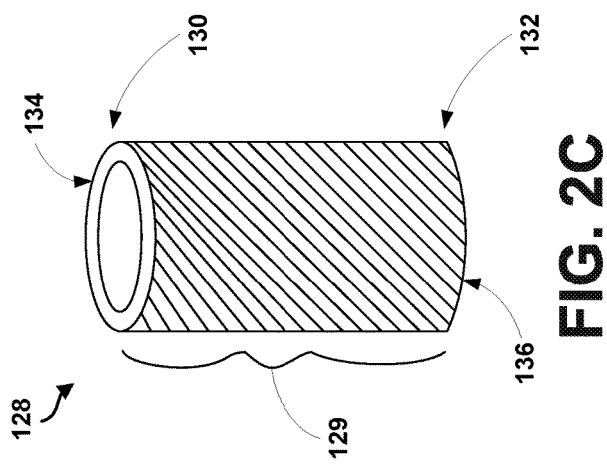
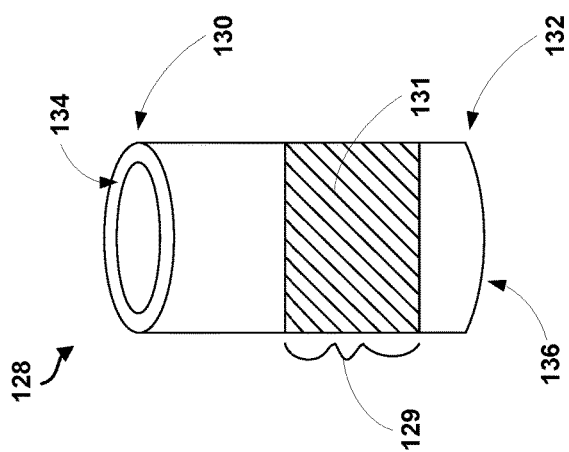

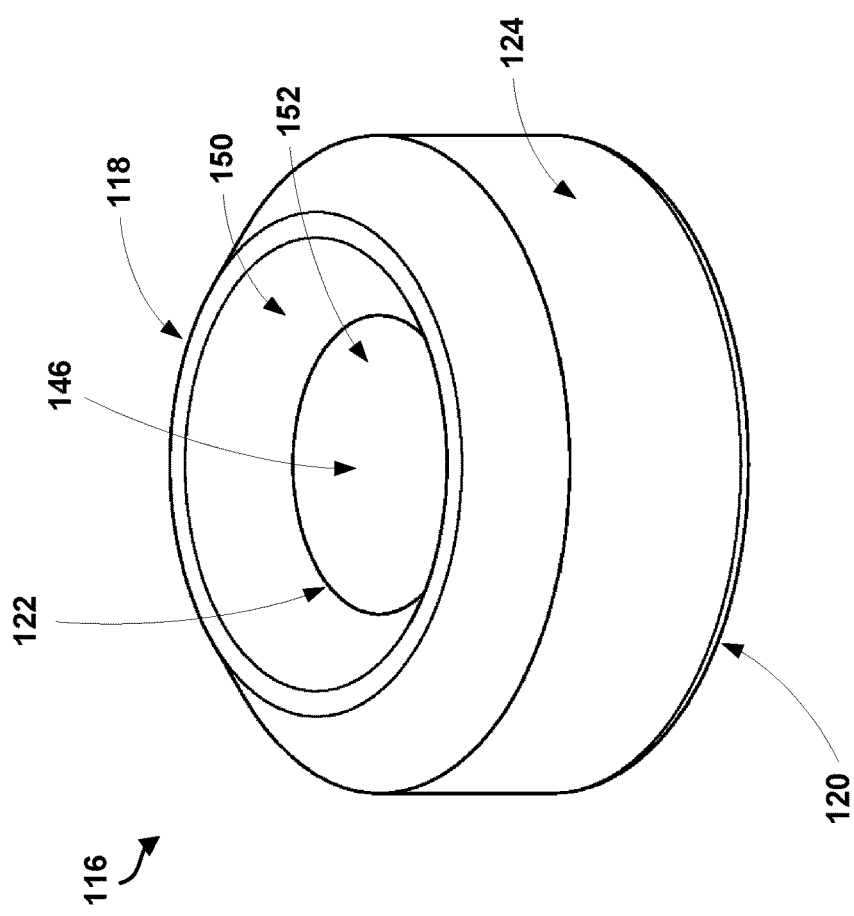

BLIND TACK FASTENER AND METHODS OF MANUFACTURE

FIELD

The present disclosure relates generally to a fastener, and more particularly, to a blind tack fastener utilized to fasten components of a workpiece together to perform manufacturing operations on the workpiece.

BACKGROUND

Fasteners are used in many manufacturing applications, including aerospace manufacturing. In such environments, it is desirable to temporarily hold and clamp parts together while other operations, such as drilling and riveting operations, are performed. For example, in aerospace manufacturing, it is becoming increasingly desirable to perform the drilling of holes and insertion of fasteners using a one-up assembly process. Traditionally, many parts are subject to disassembly after drilling to clean and deburr the parts, resulting in increased labor hours, and potentially creating damage to the components induced during disassembly and rework associated with mismatched holes after disassembly.

A one-up assembly process, by contrast, involves drilling and fastening multiple layers of a workpiece at one time, without having to disassemble the parts for other operations, such as deburring, cleaning, sealing, and other suitable operations. The layers may be parts of a workpiece that are to be fastened to each other, such as, for example, a skin panel to be fastened to a spar or spar cap, or a skin panel to be attached to a frame of a fuselage. Future production strategies contemplate a "lights out" one-up assembly process, which involves more automation and less human involvement than traditional manufacturing processes.

Tack fasteners are widely used in aerospace manufacturing to attach the parts of a workpiece together temporarily to perform operations on a workpiece. Since it is time consuming and sometimes difficult (and, therefore, expensive) to fasten parts together temporarily using conventional mechanical devices, such as nuts and bolts, tack fasteners have been developed to avoid these problems.

While various tack fasteners have been developed, "blind" tack fasteners (i.e., fasteners that can be fully installed from a single side of a structural assembly) are frequently desirable, at least in the aircraft industry. Pop rivets and one-sided installation (OSI) bolts are two known types of blind fasteners. Frequently, blind tack fasteners are made out of relatively soft metals, such as aluminum, to allow the tack fasteners to be removed easily by drilling once the desired operations have been completed on the workpiece. Although tack fasteners made of soft metals can be removed easily, one disadvantage of such tack fasteners is that they may not provide sufficient clamp-up force to attach certain parts together, particularly in an automated one-up assembly process. In particular, when installing fasteners in interference fit conditions, existing tack fastener clamp up force may not be sufficient to keep the pieces of structure from separating. Further, existing fasteners may start expanding in the hole in the workpiece rather than forming a bulb on the back side of the workpiece, thereby damaging the workpiece. As such, an improved blind tack fastener may be desirable.

SUMMARY

In one aspect, a blind tack fastener is described. The blind tack fastener includes (a) an elongated body having a first end and a second end opposite the first end, (b) a collar surrounding a portion of the elongated body, and (c) a sleeve surrounding the elongated body and positioned between the second end of the elongated body and the collar, wherein a region of the sleeve is band annealed.

In another aspect, another blind tack fastener is described. The blind tack fastener includes (a) an elongated body having a first end and a second end opposite the first end, (b) a collar surrounding a portion of the elongated body, wherein the collar includes a top collar surface and a bottom collar surface opposite the top collar surface, wherein the top collar surface includes an angled surface, and wherein a diameter of the angled surface decreases in a direction towards the bottom collar surface to thereby form a recessed hole in the top collar surface, (c) a plurality of textured elements positioned on the bottom collar surface, and (d) a sleeve surrounding the elongated body and positioned between the second end of the elongated body and the collar, wherein a color of the collar is different than a color of the elongated body and a color of the sleeve, and wherein a region of the sleeve is band annealed.

In yet another aspect, a method of manufacturing a blind tack fastener is described. The method includes (a) forming an elongated body having a first end and a second end opposite the first end, (b) forming a collar having a top collar surface and a bottom collar surface opposite the top collar surface, (c) positioning the collar around a portion of the elongated body. (d) forming a sleeve having a first sleeve end and a second sleeve end opposite the first sleeve end, wherein a region of the sleeve is band annealed, and (e) positioning the sleeve between the second end of the elongated body and the collar.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

FIG. 2A illustrates a side view of an example sleeve, according to an example embodiment.

FIG. 2B illustrates a side view of another example sleeve, according to an example embodiment.

FIG. 2C illustrates a side view of another example sleeve, according to an example embodiment.

FIG. 3A illustrates a perspective view of an example collar, according to an example embodiment.

FIG. 3B illustrates a side cross-sectional view of the collar of FIG. 2A, according to an example embodiment.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 7:
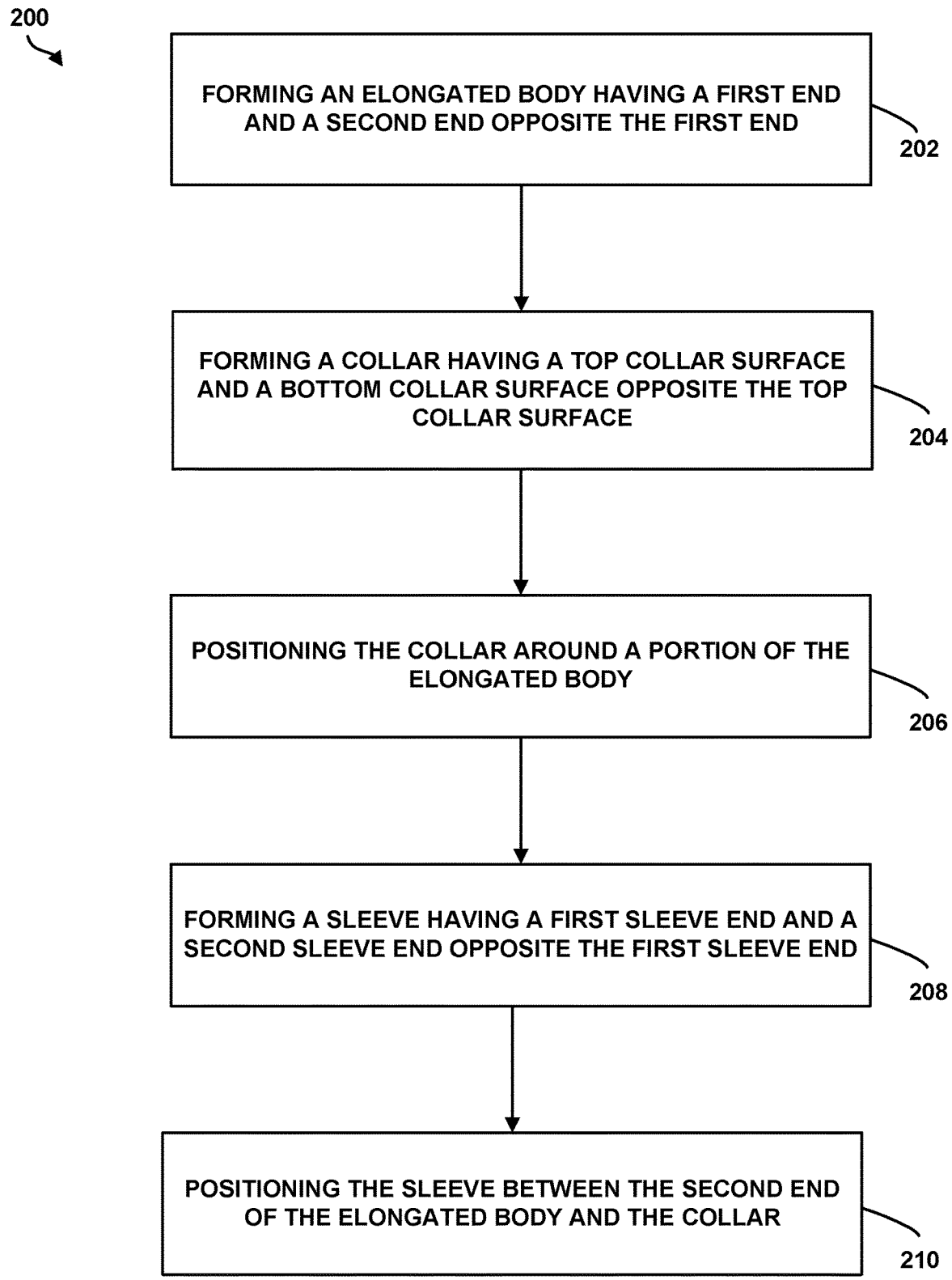
FIG. 7 is a flowchart of an example method, according to an example embodiment.

In FIG. 7, the blocks represent operations and/or portions thereof and lines connecting the various blocks do not imply any particular order or dependency of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means+/−5%.

Illustrative, non-exhaustive examples, which may or may not be claimed, of the subject matter according the present disclosure are provided below.

Figure 1A:
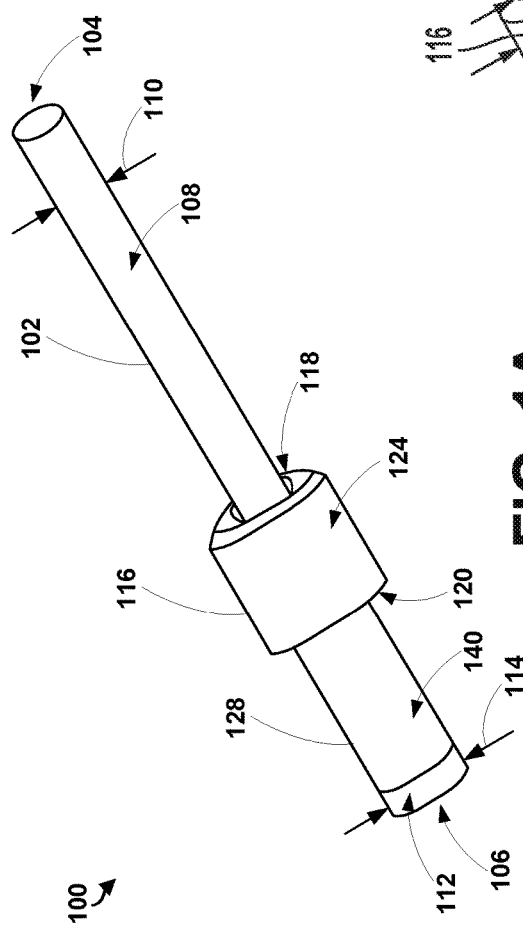
FIG. 1A is a perspective view of an example blind tack fastener, according to an example embodiment.
Figure 1B:
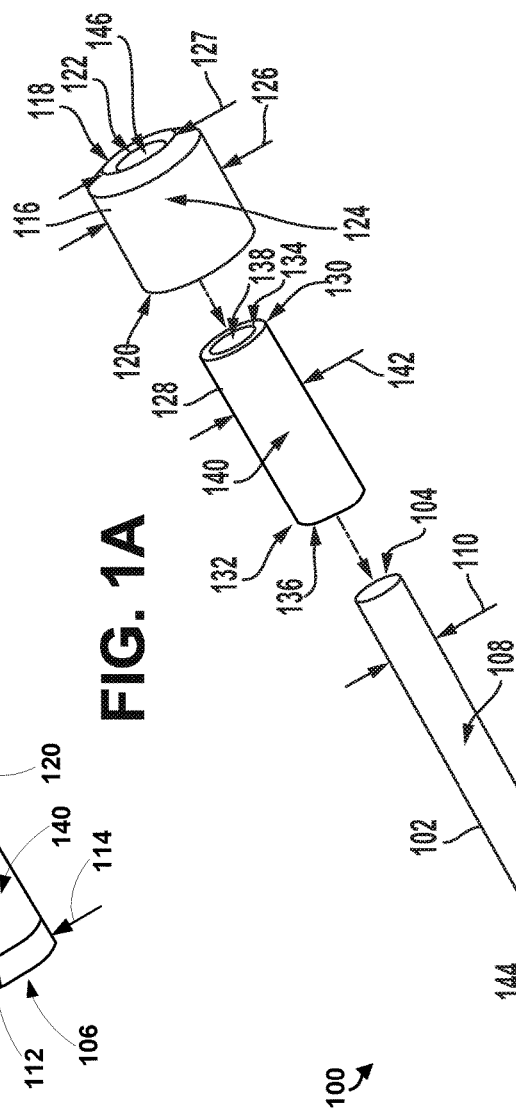
FIG. 1B is an exploded view of the example blind tack fastener of FIG. 1A, according to an example embodiment.

With reference to the Figures, FIG. 1A illustrates a perspective view of a blind tack fastener 100 and FIG. 1B illustrates an exploded view of the blind tack fastener 100 of FIG. 1A, according to example embodiments. As shown in FIG. 1A, the blind tack fastener 100 includes an elongated body 102 having a first end 104 and a second end 106 opposite the first end 104. The first end 104 of the elongated body 102 has a first outer surface 108 with a first outer diameter 110, and the second end 106 of the elongated body 102 has a second outer surface 112 with a second outer diameter 114 larger than the first outer diameter 110. Preferably, the elongated body 102 is made of a material having a relatively high yield strength and machinability rating. For example, in some cases, the elongated body 102 is an aluminum pull stem made of aluminum, an aluminum alloy, or corrosion resistant steel having a yield strength greater than about 60 ksi and a machinability rating greater than about 40%. Other example materials are possible as well.

The blind tack fastener 100 further includes a collar 116 surrounding a portion of the elongated body 102. As shown in the exploded view of the blind tack fastener 100 in FIG. 1B, the collar 116 includes a top collar surface 118 and a bottom collar surface 120 opposite the top collar surface 118. Further, the collar 116 includes an inner surface 122 in contact with the first outer surface 108 of the elongated body 102. In one example, the collar 116 includes an outer surface 124 with an outer diameter 126 larger than the second outer diameter 114 of the second end 106 of the elongated body 102. Further, an inner diameter 127 of the collar is greater than the first outer diameter 110 of the elongated body 102, such that the elongated body 102 can be positioned through the collar 116 and the elongated body 102 can move longitudinally within the collar 116 when the blind tack fastener 100 is in use. Preferably, the collar 116 is made of a material having a relatively low yield strength. For example, in some cases, the collar 116 is made of aluminum, an aluminum alloy, or corrosion resistant steel having a yield strength less than about 50 ksi.

The blind tack fastener 100 further includes a sleeve 128 surrounding the elongated body 102 and positioned between the second end 106 of the elongated body 102 and the collar 116. The sleeve 128 includes a first sleeve end 130 and a second sleeve end 132 opposite the first sleeve end 130. The sleeve 128 also includes a top sleeve surface 134 adjacent the first sleeve end 130 and a bottom sleeve surface 136 opposite the top sleeve surface 134 and adjacent the second sleeve end 132. The top sleeve surface 134 contacts the bottom collar surface 120, and the bottom sleeve surface 136 contacts the second end 106 of the elongated body 102. The larger second outer diameter 114 of the elongated body 102 is configured to relieve stress between the elongated body 102 and the sleeve 128 during installation of the blind tack fastener 100. The sleeve 128 includes an inner surface 138 in contact with the first outer surface 108 of the elongated body 102. In one example, the sleeve 128 includes an outer surface 140 with an outer diameter 142 substantially equal to the second outer diameter 114 of the second end 106 of the elongated body 102. Preferably, the sleeve 128 is made of a material having a relatively low yield strength and a relatively high ductility. For example, in some cases, the sleeve 128 is made of steel or a suitable alloy having a yield strength less than about 40 ksi and a ductility greater than about 15%. In other cases, the sleeve 128 is made of aluminum, copper, corrosion resistant steel, or another suitable alloy demonstrating similar characteristics.

Further, as shown in FIGS. 2A-2C, a region 129 of the sleeve 128 is band annealed. As used herein, the term "band annealing" refers to a heat treatment that alters the physical properties of a material to increase its ductility and reduce its hardness, making the material more workable. The band annealing process involves heating a material above its recrystallization temperature, maintaining a suitable temperature for a suitable amount of time, and then cooling. In the exemplary embodiment, the band annealing process utilizes an induction coil or similar element to uniformly heat the desired portion of the sleeve 128. The temperature and time for the induction heating process will depend on the particular material properties of the sleeve 128. Band annealing a region 129 of the sleeve 128 enables the sleeve 128 to buckle in the proper location when the blind tack fastener 100 is in use, as discussed in additional detail below. As such, in the embodiment shown in FIG. 2A, the region 129 of the sleeve 128 that is band annealed also defines a crush region 131, and the crush region 131 is configured to deform into a bulb 166 during installation of the blind tack fastener 100. In particular, the region 129 of the sleeve 128 that is band annealed is configured to extend through a hole in a workpiece so that the crush region 131 of the sleeve 128 can buckle on the backside of the workpiece to thereby form a bulb 166 during installation of the blind tack fastener 100. Band annealing a region 129 of the sleeve 128 facilitates reducing and or eliminating uncontrolled buckling of the sleeve 128, uncontrolled tensile strength of the sleeve 128, and damage due to buckling of the sleeve 128 in the hole of the workpiece.

Accordingly, at least a portion, e.g. the crush region 131, of the sleeve 128 is band annealed. In one example, as shown in FIG. 2A, the region 129 of the sleeve that is band annealed is positioned between the first sleeve end 130 and the second sleeve end 132 such that neither the first sleeve end 130 or the second sleeve end 132 is band annealed. In another example, as shown in FIG. 2B, the region 129 of the sleeve that is band annealed extends from the second sleeve end 132 to a location between the first sleeve end 130 and the second sleeve end 132 such that a portion of the sleeve adjacent to the first sleeve end 130 is not band annealed. In another example, as shown in FIG. 2C, the region 129 of the sleeve 128 that is band annealed extends from the first sleeve end 130 to the second sleeve end 132. The sleeve 128 is band annealed using any process or method known in the art.

As shown in FIG. 1B, in an exemplary embodiment, the blind tack fastener 100 also includes a breakaway groove 144 in the elongated body 102. The breakaway groove 144 is configured to be located within a lumen 146 of the collar 116. The breakaway groove 144 functions as a predictive fracture point of the elongated body 102 when the blind tack fastener 100 is in use, as discussed in additional detail below. Further, the blind tack fastener 100 also includes a plurality of lock grooves 148 on the first outer surface 108 of the elongated body 102. The plurality of lock grooves 148 are configured to be located within the lumen 146 of the collar 116 which interfaces with the plurality of lock grooves 148 of the elongated body 102 with a clearance fit. The collar 116 is then be swaged onto the lock grooves 148 of the elongated body 102 using a variety of suitable swaging tools and methods that are well-known to those of ordinary skill in the art.

FIG. 3A illustrates a perspective view of the collar 116 and FIG. 3B illustrates a side cross-section view of the collar 116, according to an example embodiments. As shown in FIG. 3B, the top collar surface 118 includes an angled surface 150 where a diameter of the angled surface 150 decreases in a direction towards the bottom collar surface 120 to thereby form a recessed hole 152 in the top collar surface 118. In one example, as shown in FIG. 3B, an angle 154 of the angled surface 150 ranges from about 80 degrees to about 145 degrees.

Such an angled surface 150 of the collar 116 enables a drill bit to be easily centered in the collar 116 to drill out the elongated body 102 and thereafter remove the collar 116, as discussed in additional detail below. Traditionally, when a fastener needs to be drilled out of structure during robotic assembly, it commonly requires human involvement to pause the program and drill out the fastener by hand. Alternatively, some existing systems use a robotic program to drill out the fastener. Both of these existing examples can cause delays to the manufacturing process and potentially damage the structure. In addition, robotic systems struggle to align to the axis that is in the center of the fastener and normal to the hole, and when this happens, the robot will drill a "figure 8" or "snow man" hole. These holes will need to be oversized and cost the factory both time and money. The double conical shape in the top collar surface 118 of the present disclosure helps to center the drill bit to address the issues described above.

In use, when the elongated body 102 of the blind tack fastener 100 needs to be drilled out of the workpiece during the assembly process, it is desirable to have a feature that prevents the collar 116 of the blind tack fastener 100 from rotating. If the collar 116 rotates, it can damage the hole, the drill, or both.

Traditionally, this rotation prevention is accomplished with a handful of solutions. One existing solution is utilizing an outside piece of equipment to hold the fastener during drill out. Another existing solution provides ridges on the elongated body that engage the side of the hole. Another existing solution involves installing the fastener in an interference fit condition in the hole. All of these solutions require additional human involvement in the drilling process which increases cost. Further, these existing solutions can cause potential damage to the hole which in turn requires costly rework and the hole has to be drilled to a larger size. In the case of a robotic system being utilized, this issue becomes even more problematic because it can either damage tooling, force a pause in the program to drill out the fastener by hand, and/or require the robot system to handle an entirely additional set of drilling tools to accommodate oversizing the hole. All of the current solutions described above are susceptible to improper fastener drill out resulting in damaged and non-concentric holes. These holes will need to be oversized and cost the factory both time and money. FIGS. 4A-4D illustrate an alternative solution.

In particular, FIGS. 4A-4D illustrate the bottom collar surface 120, according to example embodiments. In the embodiment shown in FIGS. 4A-4D, the bottom collar surface 120 also includes a plurality of textured elements 156 positioned thereon. Such an arrangement increases the friction between the collar 116 and a surface of a workpiece to inhibit rotation of the collar 116 with respect to the workpiece as the elongated body 102 of the blind tack fastener 100 is drilled out of the workpiece during the assembly process, as discussed in additional detail below.

As the collar 116 would be installed by a swaging process that exerts an axially force on the workpiece, the plurality of textured elements 156 would not damage the workpiece since it is not rotating on the surface and is instead contacting the surface during formation of the bulb of the sleeve 128 on the back side of the workpiece. This maximizes the frictional force and decreases likelihood of any rotation of the collar 116 during drill out of the elongated body 102 since the force exerted by the drill on the collar 116 of the blind tack fastener 100 would not exceed the static friction force of the plurality of textured elements 156. Such an arrangement also allows the blind tack fastener 100 to be installed without an interference fit so that once the elongated body 102 is drilled out, the blind tack fastener 100 can release and push out entirely. In addition, this embodiment is ideal for re-using the blind tack fastener holes for permanent fastener holes as it mitigates the likelihood of damage during the tack drill out process.

Figure 4B:
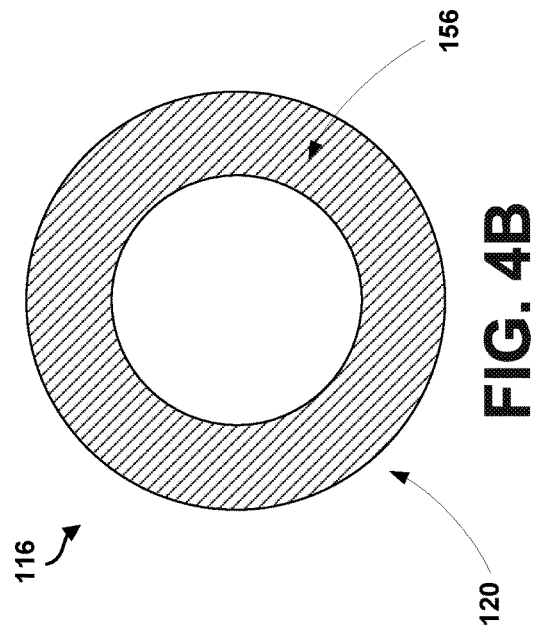
FIG. 4B is a bottom view of another collar, according to an example embodiment.
Figure 4D:
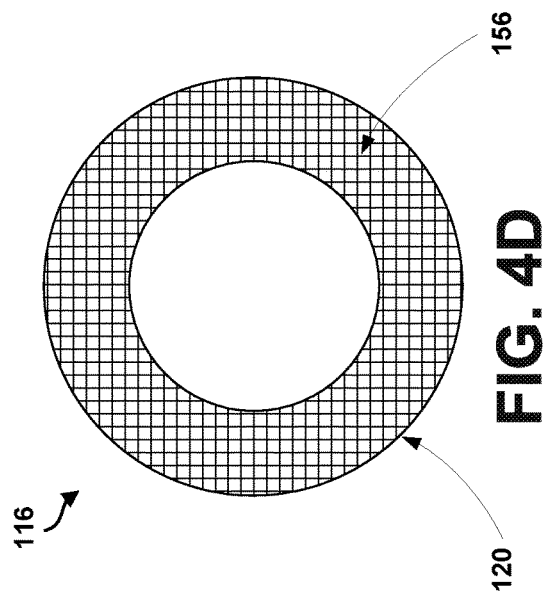
FIG. 4D is a bottom view of another collar, according to an example embodiment.
Figure 4A:
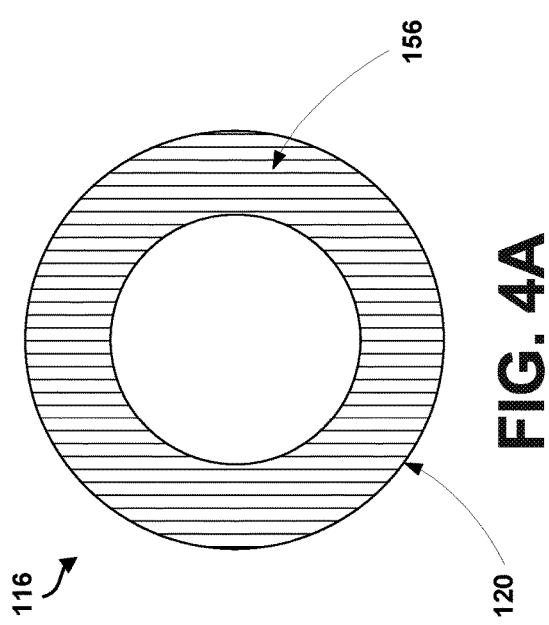
FIG. 4A is a bottom view of a collar, according to an example embodiment.
Figure 4C:
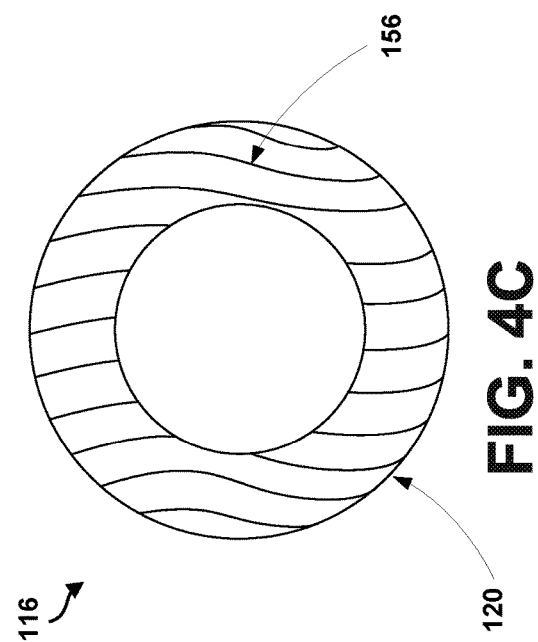
FIG. 4C is a bottom view of another collar, according to an example embodiment.

As shown in FIGS. 4A-4D, the plurality of textured elements 156 can take a variety of forms. In particular, as shown in FIG. 4A, the plurality of textured elements 156 comprise a straight line pattern. In another example, as shown in FIG. 4B, the plurality of textured elements 156 comprise a diagonal line pattern. In another example, as shown in FIG. 4C, the plurality of textured elements 156 comprise a sinusoidal line pattern. In yet another example, as shown in FIG. 4D, the plurality of textured elements 156 comprise a waffle pattern. Other patterns for the plurality of textured elements 156 are possible as well.

In one example, as shown in FIGS. 4A-4C, each of the plurality of textured elements 156 are parallel to one another. In another example, as shown in FIG. 4D, one or more of the plurality of textured elements 156 intersect one another. Such an arrangement provides increased friction between the collar 116 and the surface of the workpiece to inhibit rotation of the collar 116 with respect to the workpiece during installation. In yet another example, the plurality of textured elements 156 form a non-repeating or random pattern. Other examples are possible as well.

In one embodiment, the plurality of textured elements 156 comprise a plurality of grooves recessed in the bottom collar surface 120. In such an example, a depth of each of the plurality of grooves ranges from about 0.0005 inches to about 0.02 inches. The plurality of grooves are configured to increase the friction between the collar 116 and the surface of the workpiece to inhibit rotation of the collar 116 with respect to the workpiece during installation. In another embodiment, the plurality of textured elements 156 comprise a plurality of protrusions extending outward from the bottom collar surface 120. In such an example, a height of each of the plurality of protrusions ranges from about 0.0005 inches to about 0.02 inches. The plurality of protrusions are configured to increase the friction between the collar 116 and the surface of the workpiece to inhibit rotation of the collar 116 with respect to the workpiece during installation.

In existing blind tack fastener systems, vision systems in automated machines that drill and install one-sided fasteners struggle to align the nose piece of the fasteners that are placed into the hole prior to installation. In addition, vision systems on automated machines that drill and install one-sided fasteners struggle to align the nose piece on fasteners that are first partially installed to form an initial bulb to tack the structure together and then when the robot comes back to apply a final torque. In particular, the machines struggles to find the center point of the fastener and re-sync on the drive element.

Figure 5:
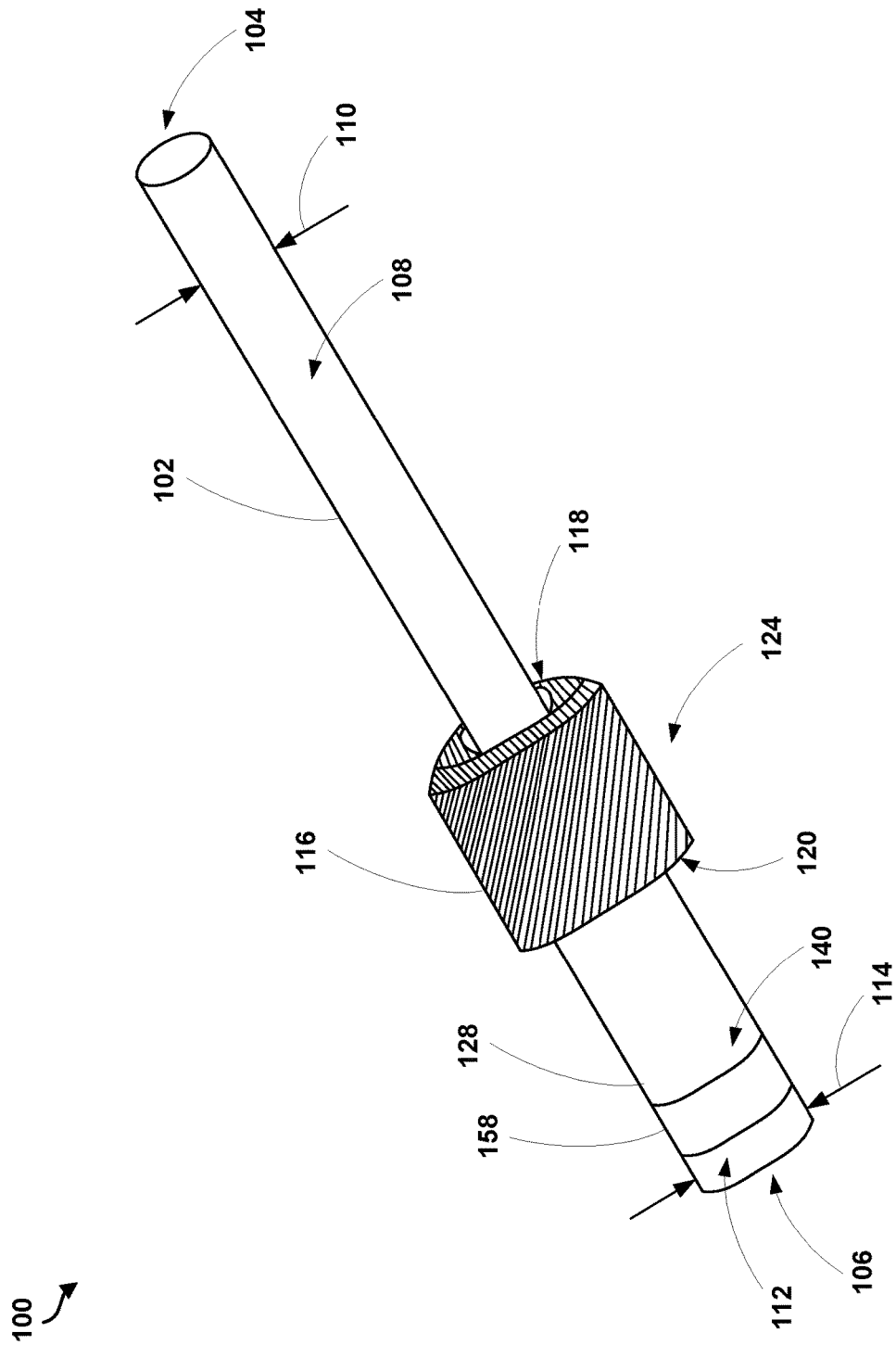
FIG. 5 is a perspective view of another example blind tack fastener, according to an example embodiment.

To address these issues in existing systems, in one example of the present disclosure a color of the collar 116 is different than a color of the elongated body 102 and a color of the sleeve 128. Such an example is illustrated in FIG. 5. In one particular example, the collar 116 is a red color that is different than a color of the elongated body 102 and a color of the sleeve 128. In one example, the entire collar 116 is a different color than a color of the elongated body 102 and a color of the sleeve 128. In another example, only the top collar surface 118 is a different color than a color of the elongated body 102 and a color of the sleeve 128. In one example, the collar 116 is painted red using traditional paint. In another example, the collar 116 is painted red with an aluminum pigment phenolic resin. Other methods of coloring the collar 116 are possible as well.

Such an arrangement with a collar 116 being red is optimal for a vision system to identify since it contrasts with the elongated body 102 and the sleeve 128 coloring, as well as the color of the workpiece itself. As an additional benefit, the red color also denotes "not fly away" in aircraft terms, which provides an additional check during manufacturing to make sure the elongated body 102 of the fastener is drilled out and the collar 116 is removed before installation of the permanent fastener and the final torqueing operation occurs.

As further shown in FIG. 5, in an exemplary embodiment, the blind tack fastener 100 further includes a washer 158 surrounding the elongated body 102 and positioned between the sleeve 128 and the second end 106 of the elongated body 102. The washer 158 has a similar outer diameter to the outer diameter 142 of the sleeve 128. The washer 158 provides a strong material to crush the sleeve 128 to form a bulb on the backside of the workpiece when the blind tack fastener 100 is in use. As such, preferably the washer 158 is made of a material having a high yield strength. For example, in some cases, the washer 158 is made of high-alloy steel having a yield strength greater than about 90 ksi.

Figure 6B:
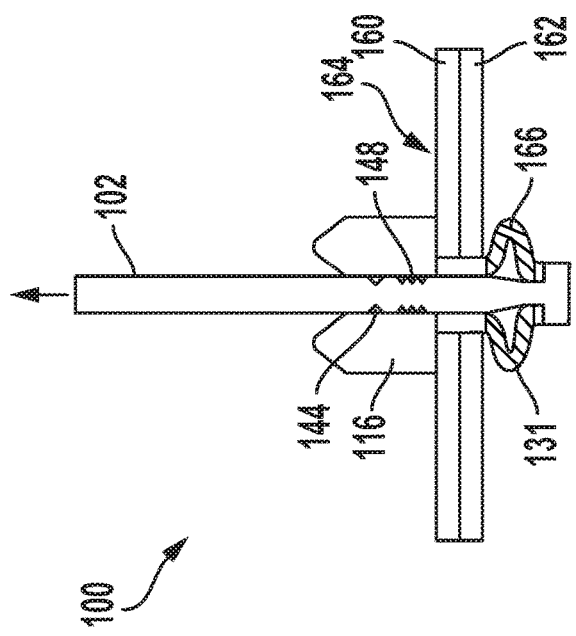
FIG. 6B is a side cross-sectional view of the blind tack fastener of FIG. 1A after the sleeve is deformed, according to an example embodiment.
Figure 6C:
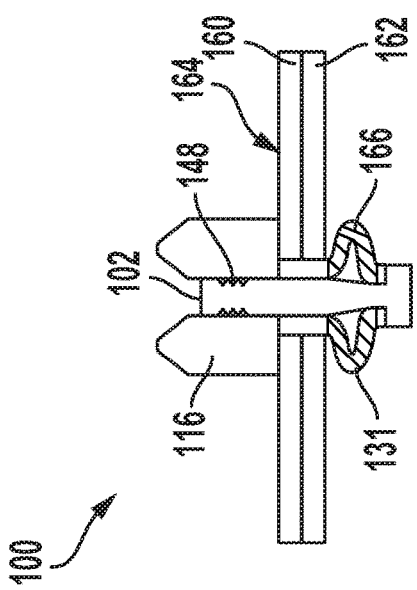
FIG. 6C is a side cross-sectional view of the blind tack fastener of FIG. 1A after a portion of the elongated member is severed, according to an example embodiment.
Figure 6A:
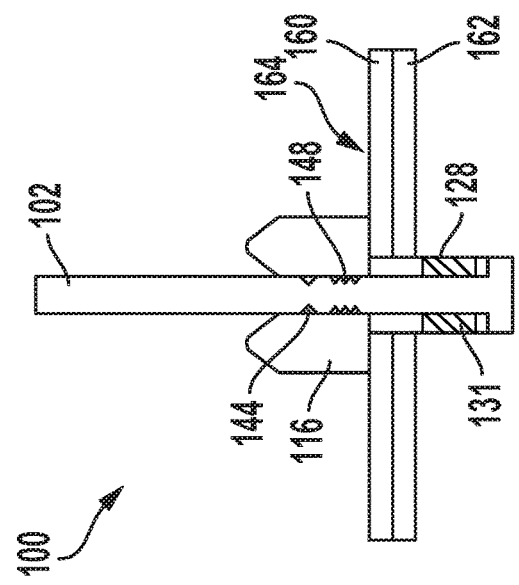
FIG. 6A is a side cross-sectional view of the blind tack fastener of FIG. 1A prior to the sleeve being deformed, according to an example embodiment.

FIGS. 6A-6C illustrate side cross-sectional views showing one example of a method for utilizing the blind tack fastener 100 of FIGS. 1A-5 to attach a first part 160 and a second part 162 of a workpiece 164 together. In a first step, as shown in FIG. 6A, the second end 106 of the elongated body 102 of the blind tack fastener 100 is inserted through aligned holes in the first part 160 and the second part 162 of the workpiece 164. The collar 116 is located on a first side of the workpiece 164, with the plurality of textured elements 156 on the bottom collar surface 120 abut a top surface of the first part 160 of the workpiece 164. At the same time, second end 106 of the elongated body 102 and a portion of the sleeve 128 protrude through the holes to the other side of the workpiece 164.

In a next step, as shown in FIG. 6B, a tool (not shown) is used to the pull the elongated body 102, which compresses the sleeve 128 against the second end 106 of the elongated body 102. As discussed above, the larger second outer diameter 114 of the elongated body 102 is configured to relieve stress between the elongated body 102 and the sleeve 128 while the elongated body 102 is being pulled. In addition, as discussed above, the region 129 of the sleeve 128 that is band annealed facilitates bulb formation in the sleeve 128 on the back side of the workpiece 164 during this step. As shown in FIGS. 6A-6C, the region 129 of the sleeve 128 that is band annealed can define a crush region 131, and the crush region 131 is configured to deform into a bulb 166 as the elongated body 102 is being pulled. As used herein, a "bulb" is defined as a deformed portion of the sleeve 128 that has a diameter greater than an outer diameter 142 of the sleeve 128 prior to deformation of the sleeve 128. This bulb 166, in turn, interacts with the bottom collar surface 120 to compress the first part 160 and the second part 162 of the workpiece 164 together until the desired clamp-up force is achieved. The collar 116 is then be swaged onto the lock grooves 148 of the elongated body 102 using a variety of suitable swaging tools and methods that are well-known to those of ordinary skill in the art.

In a next step, as shown in FIG. 6C, the elongated body 102 is severed at the predictive fracture point created by the breakaway groove 144. The remaining portion of the elongated body 102 has a length which is preferably selected such that the broken head-end surface of the elongated body 102 is positioned below the top collar surface 118 by a selected offset distance. As a result, the hole in the collar 116 can advantageously serve as a centering lead-in for a drill that can be used in a subsequent step (not shown) to remove the blind tack fastener 100, once the desired manufacturing operations have been performed on the workpiece 164. In some cases, for example, the offset distance is selected such that a 135° drill tip can be inserted into the hole in the collar 116 and the full diameter of the drill bit contacts the collar 116 before the drill tip makes contact with the elongated body 102. This configuration advantageously facilitates removing the blind tack fastener 100 by drilling the elongated body 102 through the hole in the top collar surface 118, thereby enabling the blind tack fastener 100 to be drilled out automatically and replaced with a permanent fastener, without requiring human interaction.

As discussed above, in some examples a color of the collar 116 is different than a color of the elongated body 102 and a color of the sleeve 128 to enable a vision system to more easily identify the collar during the drill out process. Further, as discussed above in relation to FIGS. 3A-3B, the top collar surface 118 includes an angled surface 150 that makes it easier to center a drill bit in the collar 116 to drill out the elongated body 102 and thereafter remove the collar 116. Further still, as discussed above in relation to FIGS. 4A-4D, the bottom collar surface 120 includes a plurality of textured elements 156 positioned thereon that help to increase the friction between the collar 116 and the first part 160 of the workpiece 164 to inhibit rotation of the collar 116 with respect to the workpiece 164 as the elongated body 102 of the blind tack fastener 100 is drilled out of the workpiece 164.

FIG. 7 is a block diagram of an example of a method 200 of manufacturing a blind tack fastener. Method 200 shown in FIG. 7 presents an embodiment of a method that could be used to manufacture the blind tack fastener 100 described above in relation to FIGS. 1A-6C, as an example. Method 200 includes one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes forming an elongated body 102 having a first end 104 and a second end 106 opposite the first end 104. The first end 104 of the elongated body 102 has a first outer surface 108 with a first outer diameter 110, and the second end 106 of the elongated body 102 has a second outer surface 112 with a second outer diameter 114 larger than the first outer diameter 110. At block 204, the method 200 includes forming a collar 116 having a top collar surface 118 and a bottom collar surface 120 opposite the top collar surface 118. At block 206, the method 200 includes positioning the collar 116 around a portion of the elongated body 102. As described above, the collar 116 includes an inner surface 122 in contact with the first outer surface 108 of the elongated body 102, and the collar 116 includes an outer surface 124 with an outer diameter 126 larger than the second outer diameter 114 of the second end 106 of the elongated body 102.

At block 208, the method 200 forming a sleeve 128 having a first sleeve end 130 and a second sleeve end 132 opposite the first sleeve end 130. As discussed above, the sleeve 128 includes a top sleeve surface 134 adjacent the first sleeve end 130 and a bottom sleeve surface 136 opposite the top sleeve surface 134 and adjacent the second sleeve end 132. As further discussed above, a region of the sleeve 128 is band annealed. At block 210, the method 200 includes positioning the sleeve 128 between the second end 106 of the elongated body 102 and the collar 116. As discussed above, the top sleeve surface 134 contacts the bottom collar surface 120, and the bottom sleeve surface 136 contacts the second end 106 of the elongated body 102. The sleeve 128 includes an inner surface 138 in contact with the first outer surface 108 of the elongated body 102, and the sleeve 128 further includes an outer surface 140 with an outer diameter 142 substantially equal to the second outer diameter 114 of the second end 106 of the elongated body 102.

In one example, the method 200 further includes forming a plurality of textured elements 156 on the bottom collar surface 120. In one example, forming the plurality of textured elements 156 on the bottom collar surface 120 comprises rolling the plurality of textured elements 156. In another example, forming the plurality of textured elements 156 on the bottom collar surface 120 comprises forging the plurality of textured elements 156. In yet another example, forming the plurality of textured elements 156 on the bottom collar surface 120 comprises laser engraving or texturing the plurality of textured elements 156. Other embodiments are possible as well.

In another example, the method 200 further includes changing a color of the collar 116 to be different than a color of the elongated body 102 and a color of the sleeve 128. As discussed above, in one example the collar 116 is painted red or another color using traditional paint, and in another example the collar 116 is painted red with an aluminum pigment phenolic resin. Other methods of coloring the collar 116 are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A blind tack fastener comprising:
   an elongated body having a first end and a second end opposite the first end, wherein the elongated body comprises a breakaway groove in the elongated body and a locking groove within the elongated body between the breakaway groove and the second end;
   a collar surrounding the locking groove and the breakaway groove such that the collar extends beyond the breakaway groove toward the first end; and
   a sleeve surrounding the elongated body and positioned between the second end of the elongated body and the collar, wherein a region of the sleeve is band annealed.

2. The blind tack fastener of claim 1, wherein the region of the sleeve that is band annealed defines a crush region, and wherein the crush region is configured to deform into a bulb during installation of the blind tack fastener.

3. The blind tack fastener of claim 1, wherein the region of the sleeve that is band annealed is positioned between a first sleeve end and a second sleeve end.

4. The blind tack fastener of claim 1, wherein the region of the sleeve that is band annealed extends from a second sleeve end to a location between a first sleeve end and the second sleeve end such that a portion of the sleeve adjacent to the first sleeve end is not band annealed.

5. The blind tack fastener of claim 1, wherein the region of the sleeve that is band annealed extends from a first sleeve end to a second sleeve end.

6. The blind tack fastener of claim 1, further comprising:
   a plurality of textured elements positioned on a bottom collar surface.

7. The blind tack fastener of claim 6, wherein the plurality of textured elements comprise one of a straight line pattern, a diagonal line pattern, a sinusoidal line pattern, or a waffle pattern.

8. The blind tack fastener of claim 6, wherein the plurality of textured elements comprise a plurality of grooves recessed in the bottom collar surface.

9. The blind tack fastener of claim 6, wherein the plurality of textured elements comprise a plurality of protrusions extending outward from the bottom collar surface.

10. The blind tack fastener of claim 1, wherein a color of the collar is different than a color of the elongated body and a color of the sleeve.

11. The blind tack fastener of claim 1, wherein a top collar surface includes an angled surface, and wherein a diameter of the angled surface decreases in a direction towards a bottom collar surface to thereby form a recessed hole in the top collar surface.

12. The blind tack fastener of claim 11, wherein an angle of the angled surface ranges from about 80 degrees to about 145 degrees.

13. The blind tack fastener of claim 1, wherein the breakaway groove and the locking groove are located at a first portion of the elongated body having a first outer diameter, wherein the sleeve is in direct contact with a second portion of the elongated body having a second outer diameter that is larger than the first outer diameter.

14. The blind tack fastener of claim 13, wherein the first portion and the second portion are formed as a singular component.

15. A blind tack fastener comprising:
   an elongated body having a first end and a second end opposite the first end;
   a collar surrounding a portion of the elongated body, wherein the collar includes a top collar surface and a bottom collar surface opposite the top collar surface, wherein the top collar surface includes an angled surface, and wherein a diameter of the angled surface decreases in a direction towards the bottom collar surface to thereby form a recessed hole in the top collar surface;
   a plurality of textured elements positioned on the bottom collar surface; and
   a sleeve surrounding the elongated body and positioned between the second end of the elongated body and the collar, wherein a color of the collar is different than a color of the elongated body and a color of the sleeve, and wherein a region of the sleeve is band annealed.

16. A method of manufacturing a blind tack fastener, the method comprising:
   forming an elongated body having a first end and a second end opposite the first end, wherein the elongated body comprises a breakaway groove in the elongated body and a locking groove within the elongated body between the breakaway groove and the second end;
   forming a collar having a top collar surface and a bottom collar surface opposite the top collar surface;
   positioning the collar around the locking groove and the breakaway groove such that the collar extends beyond the breakaway groove toward the first end;
   forming a sleeve having a first sleeve end and a second sleeve end opposite the first sleeve end, wherein a region of the sleeve is band annealed; and
   positioning the sleeve between the second end of the elongated body and the collar.

17. The method of claim 16, further comprising:
   forming a plurality of textured elements on the bottom collar surface.

18. The method of claim 16, further comprising:
   changing a color of the collar to be different than a color of the elongated body and a color of the sleeve.

19. The method of claim 16, wherein the breakaway groove and the locking groove are located at a first portion of the elongated body having a first outer diameter, wherein the sleeve is in direct contact with a second portion of the elongated body having a second outer diameter that is larger than the first outer diameter.

20. The method of claim 19, wherein the first portion and the second portion are formed as a singular component.

* * * * *